United States Patent
Keshner et al.

[11] Patent Number: 6,118,753
[45] Date of Patent: *Sep. 12, 2000

[54] ERASABLE DIGITAL VIDEO DISK WITH REFERENCE CLOCK TRACK

[75] Inventors: Marvin S. Keshner, Mountain View; Josh Hogan, Los Altos; Richard E. Elder, Palo Alto, all of Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/696,416

[22] Filed: Aug. 13, 1996

[51] Int. Cl.$^7$ .................................................. G11B 7/24
[52] U.S. Cl. ........................ 369/275.3; 369/110; 369/13
[58] Field of Search .................... 369/275.3, 275.2, 369/13, 275.1, 48, 124, 47, 59, 58, 110, 116, 54, 109, 32; 360/97, 114, 59, 77.08, 77.05; 365/122

[56] References Cited

U.S. PATENT DOCUMENTS

| | | | |
|---|---|---|---|
| Re. 32,937 | 5/1989 | Silvy et al. | 365/234 |
| 4,283,777 | 8/1981 | Curry et al. | 369/32 |
| 4,290,122 | 9/1981 | Bates et al. | 365/234 |
| 4,402,061 | 8/1983 | Hazel et al. | 365/127 |
| 4,730,289 | 3/1988 | Saitoh et al. | 369/13 |
| 4,730,293 | 3/1988 | Pierre et al. | 369/44.26 X |
| 5,062,091 | 10/1991 | Maeda et al. | 369/13 |
| 5,105,415 | 4/1992 | Tayefeh | 369/110 |
| 5,193,034 | 3/1993 | Tsuyoshi et al. | 360/51 |
| 5,202,875 | 4/1993 | Rosen et al. | 369/94 |
| 5,204,852 | 4/1993 | Nakagawa et al. | 369/275.1 |
| 5,213,859 | 5/1993 | Aoi et al. | 428/64 |
| 5,255,262 | 10/1993 | Best et al. | 369/275.1 |
| 5,272,692 | 12/1993 | Henderson et al. | 369/275.1 |
| 5,295,131 | 3/1994 | Ishibashi et al. | 369/275.3 |
| 5,377,178 | 12/1994 | Saito et al. | 369/124 |
| 5,381,401 | 1/1995 | Beest et al. | 369/275.1 |
| 5,425,014 | 6/1995 | Tsuyuguchi et al. | 369/48 |
| 5,432,774 | 7/1995 | Fukumoto et al. | 369/275.4 |
| 5,446,565 | 8/1995 | Komma et al. | 359/19 |
| 5,446,723 | 8/1995 | Best et al. | 369/275.1 |
| 5,608,710 | 3/1997 | Minemara et al. | 369/116 |

FOREIGN PATENT DOCUMENTS

| | | |
|---|---|---|
| 0144058 A2 | 6/1985 | European Pat. Off. |
| 0164131 A2 | 12/1985 | European Pat. Off. |
| 0397238 A1 | 11/1990 | European Pat. Off. |
| 0496132 A2 | 7/1992 | European Pat. Off. |
| 0516125 A2 | 12/1992 | European Pat. Off. |
| WO 97/23872 | 7/1997 | WIPO . |

OTHER PUBLICATIONS

"DVD: Coming Soon To A Home Near You"; Julie Anne Scholfield; Design News/Mar. 4, 1996; pp. 25 & 26.
"Next-Generation Compact Discs"; by Alan E. Bell; Scientific American, Jul. 1996; pp. 42–46.

*Primary Examiner*—Ali Neyzari
*Attorney, Agent, or Firm*—Augustus W. Winfield

[57] ABSTRACT

An optical disk and compatible optical disk drive enabling erasable (rewritable) optical disks to have the same format and capacity as read-only or (recordable) write-once optical disks. A reference clock track and optional additional prerecorded phase synchronization patterns are provided to enable writing of any random sector with frequency and phase matching of a random sector to the preceding and following sectors. The reference clock track and other phase synchronization patterns eliminate the need for preambles and extra space for speed variation. In a first embodiment, a disk has multiple layers, with at least one rewritable data layer and at least one reference layer. A spiral track on a surface of the reference layer has prerecorded patterns to be used for clocking. In a variation of first embodiment, the reference layer is also used for radial tracking control, eliminating the need for predefined tracks in the rewritable data layers. The reference layer is produced using the same technology as for read-only media, and is therefore very precise, low cost, and permanent. An additional laser system may be required to read the reference layer. The rewritable data layers may be unpatterned prior to writing. Alternatively, the rewritable data layers may include embossed sector or block headers to augment clock phase precision. In a second example embodiment, a single circular permanent (non-erasable) clock track is provided on a rewritable medium. The disk is then divided into radial zones, so that within each zone, the angular velocity of the disk is constant. A clock signal from the permanent clock track is then ratioed for each radial zone.

8 Claims, 4 Drawing Sheets

ERASABLE DIGITAL VIDEO DISK WITH REFERENCE CLOCK TRACK

FIELD OF INVENTION

This invention relates generally to digital optical disks and more specifically to erasable and rewritable digital optical disks.

BACKGROUND OF THE INVENTION

In general, there are three types of digital optical disks: read-only, recordable (also called Write-Once or Write-Once-Read-Many (WORM)) and erasable (also called rewritable). Examples of commercially available read-only optical disk technologies are the Compact Disk (CD) for digital audio and the Compact Disk—Read Only Memory (CD-ROM) for computer data. Compact Disk—Recordable (CD-R) drives and media are also commercially available. An example of an erasable (rewritable) optical disk technology is the Magneto-Optic disk, widely used for computer data storage.

For any electromechanical disk technology, whether magnetic or optical, there are physical limitations on information density. Some of these limitations are mechanical, for example, the tolerance on angular velocity for a disk rotation control system, or the tolerance on positioning a transducer relative to a data track. Other limitations are imposed by transducer or media physics, for example, diffraction effects in optics. In some technologies, for example many computer magnetic disks, a disk remains in a single drive for writing and reading. If the same drive writes and reads the disk, some repeatable mechanical effects may be ignored. For example, if the angular velocity of the disk is at the high extreme of an allowable range, this is not a problem since a disk recorded at the high speed will be read at the same high speed, so that data writing rates and data reading rates are identical. If a disk must be interchanged (written in one drive and read in a different drive), then the various worse case limitations of both drives combine, and the tolerances for each drive must be narrowed in order to meet an overall specification with interchange. For mass-produced read-only media, for example CD-ROM's, the process for writing a metalized master disk for molding of copies is typically a very high precision (and expensive) process. Very little of the overall allowable tolerances are used by the writing process, enabling most of the overall allowable tolerances to be used in the reading drives. Therefore, for example, portable read-only CD-ROM drives for notebook computers can have substantially broader tolerances (and substantially lower cost) than the drives producing the master disks for molding. However, if each of the drives involved in interchange can write data to a disk, then each of the drives must be limited to no more than half of any particular overall tolerance specification. For example, if the angular velocity at any particular radial head position must be accurate to ±1.0%, the angular velocity for each drive involved in interchange must be accurate to ±0.5%.

Some data formats assume that an entire medium will be recorded at one time. Other data formats assume that individual random sectors of data can be erased and rewritten. Typically, format provisions for rewriting individual sectors reduce the overall effective data capacity. CD, CD-ROM, and CD-R formats are designed for maximum data capacity with no provision for rewriting individual sectors. CD-ROM's are organized into data sectors and each data sector must be phase synchronized with the preceding sector and with the following sector. As a result, compatible CD-R disks must be written in sequence, starting from the first sector and writing each sector in the physical order that they appear on the disk. The standard CD format specifications do not support the ability to write or overwrite individual sectors with random access or to append to a partially recorded medium. Typically, recordable drives that can append to a partially recorded medium, and drives that can erase and overwrite previously recorded data, must provide data gaps for accommodating angular speed variations between drives and must provide additional clock synchronization patterns for accommodating clock differences between drives. For example, magnetic disks and magneto-optic disks are typically formatted into sectors, with each sector including a preamble for synchronizing a write clock, and with each sector including extra space at the end to allow for variations in angular velocity, each of which reduces effective data capacity. CD, CD-ROM, and CD-R formats do not have sector preambles for synchronization or extra space at the ends of sectors. In general, drives that can append or rewrite individual sectors with random access have a reduced effective disk capacity relative to drives, with the same bit density, that write an entire disk at one time.

In addition to clocking precision requirements and angular velocity precision requirements, writing drives must meet precision requirements for radial position or track following. Writable and rewritable optical disk media often have a predefined track, typically a land and groove structure. Other approaches to predefined tracks may be found in U.S. Pat. Nos. 5,213,859 and 5,204,852. Typically, for drives using grooves or similar approaches, the bandwidth and signal to noise ratio for track centering of the writing laser are not as good as that obtained by the high precision drives used for mastering read-only media. In addition, some servo approaches proposed for writable media may be incompatible with read-only formats.

Various digital optical disk standards are being planned in advance of available technology. That is, various capacities and formats have been proposed for future standardization, even though corresponding drives and media may not yet be available or practical. An example is erasable (rewritable) Digital Versatile Disks (DVD) (previously called Digital Video Disks). The proposed standards for erasable DVD's assume that the model established by CD's will continue. That is, the proposed standards assume that at any particular bit density, read-only and recordable (write-once) media will have the highest possible data capacity and erasable (rewritable) media will have a reduced effective data capacity. The proposed standards assume that erasable (rewritable) systems must have a lower capacity than read-only and recordable (write-once) systems due to the extra overhead for synchronization and gaps for drive speed variation. The proposed standards assume that writable media must have a land and groove structure or other predefined track servo information. In general, format differences between proposed erasable disks and read-only disks are incompatible, so that drives must be designed to read two separate formats, or drives designed only for read-only and write-once disks will not be able to read erasable disks. The proposed evolution or "migration path" typically specifies that for each new step in bit density, there will first be read-only products that extract the maximum possible capacity from the anticipated technology (shorter wavelength lasers and improved media characteristics), followed by recordable (write-once) products having the same capacity as the read-only products, followed by erasable products with the same bit density as read-only and recordable products, but with a lower effective capacity.

There is a need for erasable (rewritable) optical disks having the same format and the same effective capacity as read-only and write-once disks.

SUMMARY OF THE INVENTION

A reference clock track and optional additional prerecorded phase synchronization patterns are provided to enable writing of any random sector with frequency and phase matching to the preceding and following sectors. The reference clock track and other phase synchronization patterns eliminate the need for preambles and extra space (gaps) for speed variation.

In a first embodiment, a disk has multiple layers, with at least one data layer and a reference surface. A spiral track on the reference surface has prerecorded patterns to be used for clocking. In a variation of first embodiment, the reference surface is also used for radial tracking control, eliminating the need for predefined tracks in the data layers. The reference surface is produced using the same technology as for read-only media, and is therefore very precise, low cost, and permanent. An additional laser system may be required to read the reference surface. The data layers may be unpatterned prior to writing. Alternatively, the data layers may include embossed sector or block headers to augment clock phase precision.

In a second example embodiment, a single circular permanent (non-erasable) clock track is provided on the erasable medium. The disk is then divided into radial zones, so that within each zone, the angular velocity of the disk is constant. A clock signal from the permanent clock track is then ratioed for each radial zone. An additional laser system is required to read the clock track. However, in many drives, a second laser will be required for backwards compatibility. The same second laser may be used for the clock track. The two embodiments are not mutually exclusive and instead can be combined. As in the first embodiment, the rewritable data area in the second embodiment may include embossed sector or block headers to augment clock phase precision. Also, zones with constant angular velocity could be implemented in the first embodiment.

Each of the example embodiments provides the following advantages:

1. The format and effective capacity of an erasable (rewritable) disk is identical to the format and effective capacity of read-only and recordable (write-once) disks. Either of the example embodiments may also be implemented with a write-once medium, enabling partial writing with later appending.
2. Once written, the disk of either sample embodiment can be read in a standard read-only player. The reference surface (or clock track) and the additional laser system (if required) are used only during writing.
3. The incremental cost of adding a reference surface or a clock track is nominal.

The first embodiment (reference surface) provides the highest clock precision of the two embodiments and also provides radial tracking information. The second embodiment (separate clock track) provides simplicity, lower cost, and improved random access times. The second embodiment is simpler and may have lower cost because no additional layers are added to the disk and because a second reading laser may be present anyway for other reasons. Zones with constant rotational speed, in either embodiment, may provide improved random access times.

DETAILED DESCRIPTION OF THE PREFERRED EMBODIMENT OF THE INVENTION

Proposed future digital optical disk configurations include single-sided-single-layer, single-sided-dual-layer, double-sided-single-layer and double-sided-dual-layer. For dual-layer disks, an outer layer is sufficiently transparent to permit a reading laser to focus through the outer layer onto an inner layer. For double-sided disks, it is typically assumed that the disk will be "flipped" for reading either of the two sides with a single laser system, but duplicate laser systems may be provided for reading either side of the disk without flipping the disk. In general, proposed digital optical disks will have the same thickness (1.2 mm) and the same diameter (120 mm) as a compact disk.

Figure 1:
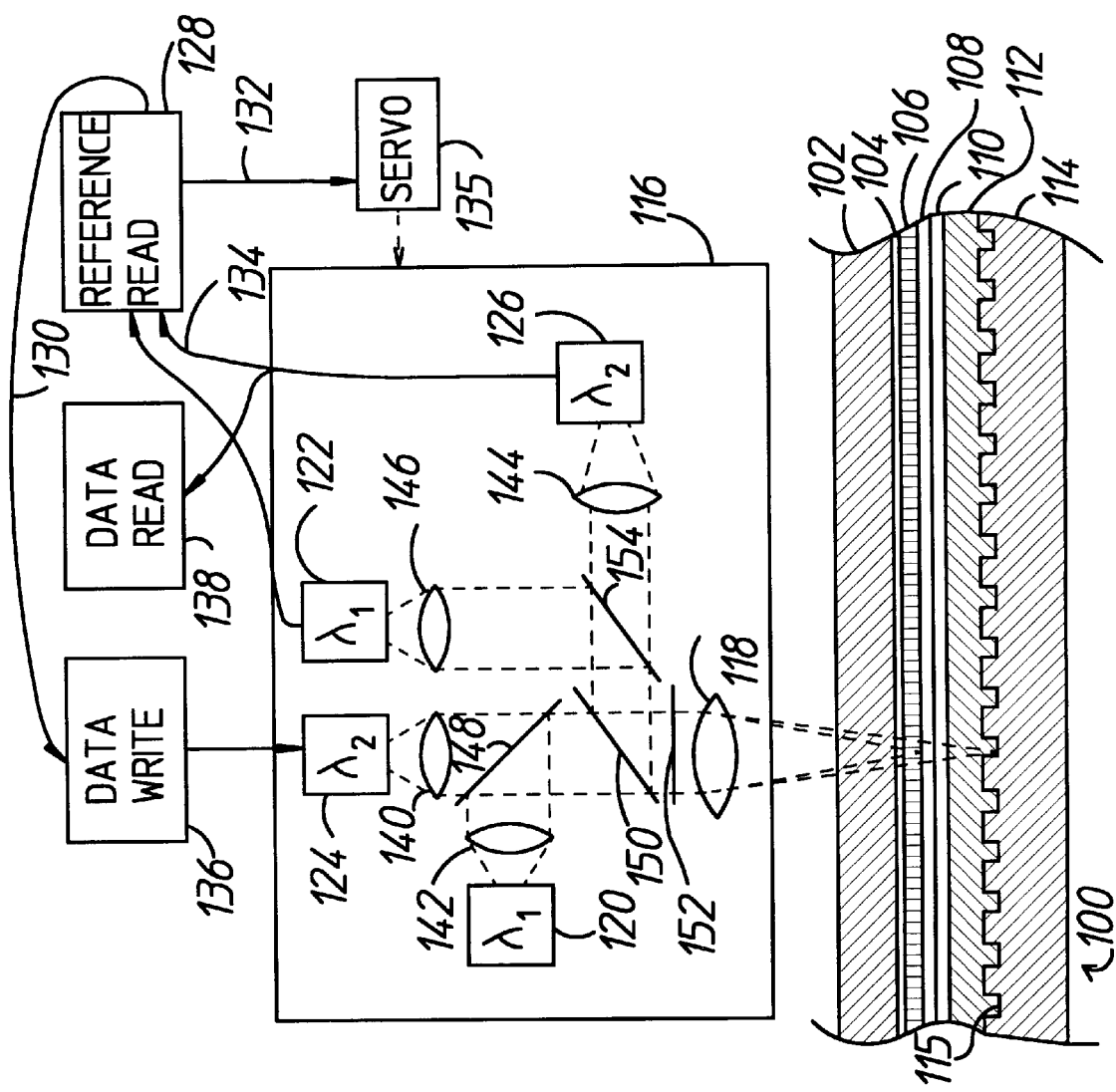
FIG. 1 is a simplified block diagram cross section of a digital optical disk and parts of an optical disk drive, in accordance with a first example embodiment invention.

FIG. 1 illustrates an example first embodiment of the invention in a single-sided, single-data-layer configuration, but the reference layer of the first embodiment is generally applicable to any configuration. In the configuration illustrated in FIG. 1, an optical disk 100 comprises multiple layers. A top substrate layer 102 may be the same as the top layer of a compact disk, typically polycarbonate. Layer 106 is an erasable (rewritable) data layer. Layer 106 may have protective coatings (104, 108) on each side and a partially reflective coating 110. Layer 114 has a nonchangeable reference data surface 115 and also provides additional support as a substrate layer. Layer 114 may be polycarbonate with a reflective coating on surface 115 (for example, aluminum) with data pits embossed in the reflective surface 115, just as data pits are embossed into a reflective surface for compact disks and CD-ROMs. Layer 112 is a bonding material, bonding the reference layer 114 to the rewritable data layer 106. A read/write laser may pass through substrate layer 102, protective coating 104, and erasable data layer 106 and reflect off of coating 110. For writing, a writing laser may physically change the transparency (for example, reversible color change of a dye) or reflectivity (for example, amorphous/crystalline phase change) of small areas of the layer 106, so that a reading laser system senses a change in intensity of a laser passing through layer 106, reflecting from the partially reflective coating 108, and passing back through layer 106. In the embodiment illustrated in FIG. 1, the laser from a read/write laser system and the laser from a reference laser system pass through a common objective lens, but each laser is focused onto a different layer of the disk 100. Various ways of achieving two different focal distances with a common objective lens will be discussed later below.

The overall thickness of disk 100 may be about 1.2 mm (the same as a compact disk). Layer 114 may be about 0.6 mm thick (the same as the embossed polycarbonate substrate for a compact disk). The erasable data layer 106 may be about 20–50 nm thick. The bonding layer 112 may be about 30–50 μm thick. Embossed pits in the reference surface 115 may be about 100–200 nm deep.

In FIG. 1, an optical head 116 has a single final objective lens 118 shared by two laser systems, a reference laser system (120, 122) and a read/write laser system (124, 126). The reference laser system (120, 122) is used only for reading the pitted reference surface 115. Reference number 120 depicts a laser source and reference number 122 depicts a photodetector system. The read/write laser system (124, 126) is used for reading and writing on the erasable (rewritable) data layer 106. Reference number 124 depicts a laser source and reference number 126 depicts a photodetector system.

An electronic reference read system 128 reads patterns via the reference laser system (120, 122) from the pitted surface 115 of the reference layer 114, generates a synchronized clock signal 130, and optionally generates a servo signal 132. The electronic reference read system 128 may optionally receive additional information via the read/write laser system (124, 126) (depicted by line 134) from the erasable (rewritable) data layer 106 to augment phase synchronization. An electronic data write system 136 controls writing on the erasable (rewritable) data layer 106 by the read/write laser source 124. An electronic data read system 138 controls reading from the erasable (rewritable) data layer 106.

Figure 2:
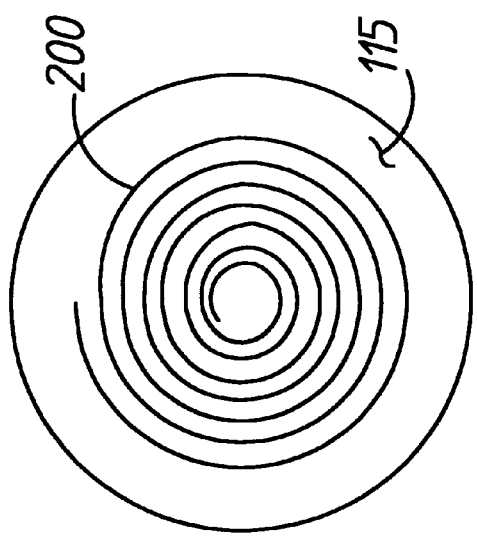
FIG. 2 is a horizontal cross section of the optical disk of FIG. 1 illustrating a spiral reference track on the reference layer.

The pitted reference surface 115 has a spiral track (FIG. 2, 200) containing bit patterns used to determine the frequency of clock signal 130 for data that is written by the data write system 136 in the data layer 106. In a variation, the patterns on the reference surface 115 may also be used for radial position control of the head 116 during writing. The reference surface 115 on reference layer 114 is mastered and molded (embossed) using a process that may be identical to the process for manufacturing read-only disks. Therefore, the reference surface 115 is very precise but very low cost.

The erasable data layer 106 preferably has a format that is identical to that of read-only disks. That is, once written, the disk 100 can be read in a standard read-only player. The reference surface 115 and the reference laser system (120, 122) are used only during the writing process.

In the first embodiment as illustrated in FIG. 1, the erasable data layer 106 must be sufficiently transparent to enable focusing a laser through at least one data layer and onto the reference surface 115. For example, the erasable data layer 106 may be a partially transparent phase-change material. During writing, a laser beam from reference laser source 120 is continuously focused through the final objective lens 118 onto the embossed reference surface 115 and is used to read information (via reference photodetector system 122) from the reference surface 115. Enough light must penetrate through the data layer 106 and the partially reflective coating 110 so that the reference surface 115 can be read while the data layer 106 is being written. Examples of multiple layer optical disks may be found, for example, in U.S. Pat. Nos. 5,202,875; 5,255,262; 5,381,401 and 5,446,723.

At a minimum, the information on the reference surface 115 is used to determine the frequency of the clock signal 130 used to write the data onto the erasable data layer 106. Extra space at the end of each disk sector in the erasable data layer 106 is not required because the data rate during writing is continuously adjusted to match the data rate of the pattern on the pitted reference surface 115. The information on the pitted reference surface 115 may also be used to determine the phase of the clock 130 used to write data. Since the data in each sector is phase synchronized to the clock obtained from the reference surface 115, each sector is phase synchronized to the preceding and following sectors, regardless of the order in which the sectors are written. Sector preambles in the erasable data layer 106 are not required. This enables writing drives to be constructed with relatively inexpensive angular velocity servo components while providing the capability to write a disk that meets the specifications of read-only disks.

To maximize the bandwidth and signal to noise ratio of the reference signal, the data pattern for the reference surface 115 is preferably encoded at the maximum information density allowed by the technology, which is typically the same density as a read-only disk. An example suitable data pattern is 100100100100100 centered and repeating along a spiral track (FIG. 2, 200) on the reference surface 115. A high frequency embedded servo pattern may also be included. Sector beginning and end markers may be included and sector numbers and track numbers may be included. The key requirement for the reference surface pattern is that it must provide a high bandwidth and low noise servo reference signal that can be used by the clock synchronization circuit (reference read system 128) and optionally by the track centering positioning system (servo 135). With a low noise and high bandwidth reference signal, these systems can correct for errors induced by a lack of precision in the components in the writing drive.

The position of the reference surface 115 relative to the erasable data layer 106 may shift slightly with time and temperature. In addition, because the reference laser 120 reading the reference surface 115 must pass through the erasable data layer 106 twice, the phase of the clock signal 130 obtained from the reference surface 115 may be sensitive to disk tilt and disk misalignment. Therefore, additional information may be needed to control the phase of the write clock 130. Portions of the data track on the erasable data layer 106 may be permanently embossed to augment synchronization of the clock signal from the reference track 200.

Figure 3A:
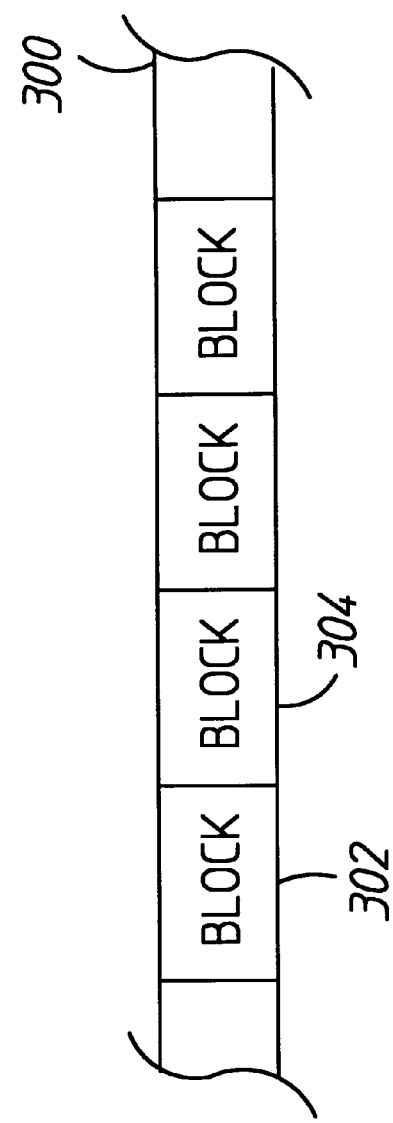
FIG. 3A is a block diagram of a data track on the erasable layer of the optical disk of FIG. 1, illustrating formatting into blocks.
Figure 3B:
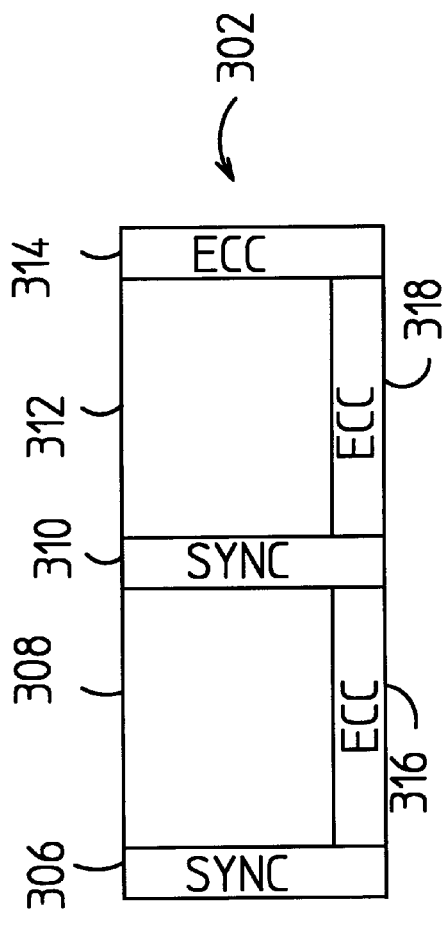
FIG. 3B is a block diagram illustrating the logical format of the blocks of FIG. 3A.

FIG. 3A illustrates a portion of a spiral data track 300 on the erasable data layer 106. Some proposed optical disk format standards specify 32-kbyte data blocks (302, 304). FIG. 3B illustrates one proposed logical format of a data block (302, 304). Each block is logically formatted into 192 rows. Each row has a 32-bit synchronization mark 306, followed by 91 bytes of data 308, followed by another 32-bit synchronization mark 310, followed by another 91 bytes of data 312, followed by an error correction code (ECC) field 314 for the row. The last rows provide ECC data (316, 318) for column error correction.

Figure 3C:
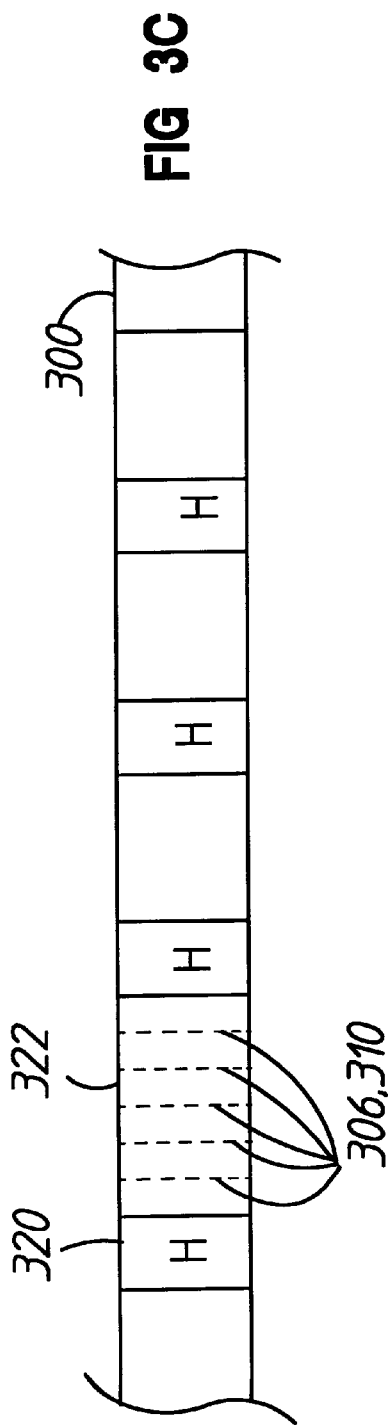
FIG. 3C is the data track of FIG. 3A illustrating sectors within a block.

FIG. 3C illustrates the physical data track 300 of FIG. 3A, illustrating additional detail within a block. Each block has 16 sectors (322), with each sector having a header field (320). Proposed read-only format standards include sector headers but not the longer synchronization preambles required by proposed writable format standards. The 32-bit sync marks (306, 310) of FIG. 3B are illustrated in FIG. 3C as periodically occurring every 91 bytes within each sector (322). Sector headers (320) and sync marks (306, 310) are fixed patterns and may be made unchangeable (for example, by embossing these patterns on layer 106). Physically, sync marks (306, 310) occur every 0.198 mm along a data track 300 and sector headers 320 occur every 5.15 mm along a data track 300. As an alternative, or as additional phase synchronization augmentation, approximately 2,976 bits at the end of each data block (part of the ECC data) can be replaced with an embossed preamble for the following data block. This would allow recovery from a significant phase error, but would require an improved signal to noise ratio to compensate for the reduction in error correction capability. Physical block lengths are about 82.3 mm.

Providing embossed synchronization patterns on the erasable layer 106 in conjunction with the signal from the reference surface 115 would enable an even higher bandwidth reference for correcting the phase of the write clock 130 (FIG. 1). Combining the high bandwidth frequency and phase information from the reference surface 115 with a once-per-91-bytes or once-per-sector or once-per-block phase reference from an erasable data layer 106 enables a write clock 130 with a very precise phase, little drift, and the ability to compensate for slowly varying misalignments between the data layer 106 and the reference surface 115.

Ideally, the spiral reference clock track 200 on the reference surface 115 is also used to determine the position of the focused read/write laser beam 124 relative to the center of the desired track 300 in the erasable data layer 106. This information can be used to control the actuator that moves the optical head 116 radially. Since the information on the reference surface 115 is very precise, and can be made very high bandwidth (relative to alternative writable data surface servo information such as wobble grooves), the resulting closed loop performance of the servo 135 can be very good. Therefore, data can be written in the data layer 106 with a precision that approaches the precision obtained in the mastering and molding process used for read-only disks. As a result, a writing drive can obtain the required precision during writing even though the writer is constructed with inexpensive components and subject to significant disturbances from external shock and vibration.

Preferably, both the laser beam that reads a reference surface 115 and the laser beam that writes in a data layer 106 are focused through the same final objective lens 118. It is possible to use two separate lenses, but two lenses would require a precise connection and something to prevent their relative movements. Otherwise, keeping one lens on track would not keep the other lens on track. By using the same final objective lens 118, this difficulty is avoided.

Several techniques may be used to separately focus, through a single final objective lens, the beam that is used for reading the reference layer and the beam that is used for writing. One technique for separately focusing two beams through one final objective lens is to use two different wavelengths for the two lasers, as depicted in FIG. 1. For example, the laser reading the reference layer can be red and the laser for writing on the data layer can be blue or green. An advantage of using lasers with different wavelengths is that it is relatively easy to separate the two returned beams.

In FIG. 1, plates 148 and 154 are wavelength sensitive mirrors, plate 150 is a polarization sensitive mirror, and plate 152 is a quarter wave plate that rotates polarization by approximately 45° (wavelength dependent). Light from laser 120 reflects from wavelength sensitive plates 148 and 154 and light from laser 124 passes through the wavelength sensitive plates 148 and 154. Light from both lasers 120 and 124 passes through polarization sensitive plate 150 with an initial polarity, and each of the lasers passes through plate 152 twice for a total rotation of approximately 90° (wavelength dependent) which causes each of the lasers to then reflect off of the polarization sensitive plate 150. As a result, light from laser 120 reflects from plate 148, passes through plate 150, passes through plate 152 twice, and then is reflected by plates 150 and 154. Light from laser 124 passes through plates 148, 150, 152 (twice), is then reflected off of plate 150 and then passes through plate 154.

Lens 118 may be wavelength sensitive to focus the two lasers at two different layers on disk 100. Alternatively, or additionally, each laser can have one or more separate lenses (140, 142) upstream from the final objective lens 118, that provide some focusing. Alternatively, the objective lens 118 can have two slightly different curvatures. For example, the curvature in the center of the lens may focus on the reference surface 115 and the curvature at the periphery may focus on the reflective coating 110 on the data layer 106. The laser for reading the reference surface 115 would then pass through the center of the final objective lens 118 while the beam for writing to layer 106 passes through the periphery. This would have the advantage of using a slightly lower numerical aperture (NA) for reading the reference layer 114 and the highest NA for writing. Using only the periphery of the lens has been reported in the literature as "optical super resolution". It creates a smaller central lobe of the focused beam at the expense of larger amplitude side lobes and can be used to write smaller spots than can be achieved with a gaussian shaped spot. For an example lens design providing two focal points, see U.S. Pat. No. 5,446,565.

With a dual focus lens 118 and good control of the separation (bonding layer 112) between the reference surface 115 and the erasable data layer 106, one focus adjustment may be sufficient to focus on both layers. If the separation cannot be well controlled, then some separate focusing may be required. Again, upstream focus (for example, lenses 140 and 142) would easily provide the necessary adjustment.

In one present proposal for multiple layer optical disks, the data layers have a thickness of 30–50 nm. The focal length of the objective lens is typically about 600 $\mu$m, so that the necessary amount of upstream focus or the necessary change in the lens curvature is very small.

Even with both laser beams focused through the same final objective lens 118, tilt of the surface of the disk 100 with respect to the lens 118 must be limited. If the reference surface 115 is 50 $\mu$m farther from the lens 118 than the reflective coating 110 on the data layer 106, a tilt in the radial direction of 0.1 degrees would produce an off-track movement of about 10% of a track (proposed track pitch is 0.74 $\eta$m). For acceptable error rates, if the drive uses the reference track 200 for track centering, 0.1 degrees is a reasonable design target limit for tilt. If the distance between layers is decreased, the acceptable tilt would be increased accordingly.

Figure 4:
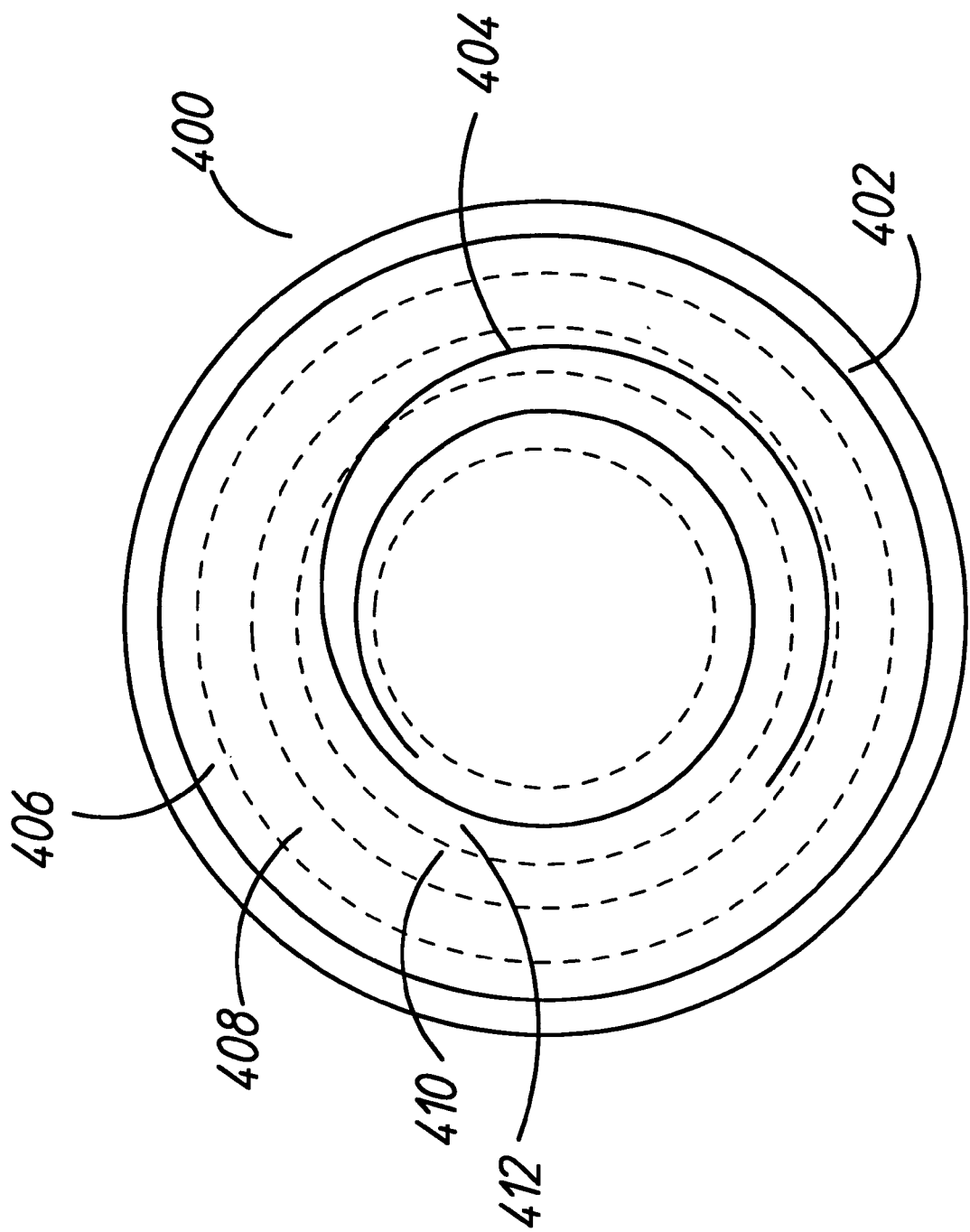
FIG. 4 is a simplified top view of a digital optical disk in accordance with a second example embodiment of the invention.

FIG. 4 illustrates a digital optical disk in accordance with a second example embodiment of the invention. In FIG. 4, an erasable disk layer 400 includes a permanent circular reference clock track 402. One laser system remains at the radial distance of the circular reference clock track 402 while a second laser system writes on a spiral data track 404 (only partially illustrated).

CD's and proposed read only optical disks typically are written along a single spiral track with a constant bit density along the spiral track. As the track spirals from a small inner radius to a large outer radius, the angular velocity of the disk must decrease to provide a constant linear velocity (constant bit density for a constant frequency writing clock). For the CD-ROM standard, the constant linear velocity is 1.3 meters/second. To accomplish this constant linear velocity, the rotational speed of the disk changes from 500 rpm closest to the center of the disk to 200 rpm at the outer edge of the disk. In general, for CD's, the random access time for reading a sector includes the time required to adjust the angular velocity of the disk. For general background information, see Sherman, Chris, *The CD ROM Handbook*, Multiscience Press, Inc., 1988.

In the embodiment illustrated in FIG. 4, the frequency of the reference clock derived from the reference clock track 402 will vary with the angular velocity of the disk. As the writing laser progresses toward the edge of the disk, the angular velocity of the disk will decrease, so that the clock frequency read from the reference clock track 402 will be greater than the frequency required for writing. Therefore, in general, the frequency of the clock for writing must be ratioed from the frequency of the signal from the reference clock track 402. In the embodiment illustrated in FIG. 4, the disk is divided into multiple radial zones (406–412). Within each radial zone, the writing clock frequency and the angular velocity of the disk are kept constant. Within each radial zone, the bit density varies slightly as the spiral track radius changes. Since the angular velocity is constant within each radial zone, random access times within a zone are improved because no angular velocity change is required. Since each zone requires a write clock that is a fraction of the clock signal produced by the reference clock track 402, embossed headers as discussed in conjunction with the first embodiment may be necessary to ensure precise phase synchronization.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An optical disk comprising:
   a rewritable layer, containing data;
   a reference layer that is separate from the rewritable layer;
   a reference clock track that is permanent, the reference clock track being on the reference layer;
   a pattern on the reference clock track for a clock used for writing data on the rewritable layer; and
   one of the data in the rewritable layer and the pattern on the reference clock track positioned beneath the other relative to an exterior surface of the disk.

2. The optical disk of claim 1, the reference clock track comprising a spiral track.

3. The optical disk of claim 2, the rewritable layer including sector headers that are permanent, a phase of the clock used for writing data synchronized to a phase determined by the sector headers.

4. The optical disk of claim 2, the rewritable layer including synchronization markers that are permanent, a phase of the clock used for writing data synchronized to a phase determined by the synchronization markers.

5. The optical disk of claim 2, the rewritable layer including block headers that are permanent, a phase of the clock used for writing data synchronized to a phase determined by the block headers.

6. The optical disk of claim 2, the rewritable layer including sector preambles that are permanent, each sector preamble positioned in an error correction code area of a previous sector, a phase of the clock used for writing data synchronized to a phase determined by the sector preambles.

7. An optical disk comprising:
   a rewritable layer;
   a reference layer that is separate from the rewritable layer, one of the reference layer and the rewritable layer positioned beneath the other relative to an exterior surface of the disk;
   a reference clock track that is permanent, the reference clock track being on the reference layer;
   a pattern on the reference clock track for a clock used for writing data on the rewritable layer; and
   a plurality of clock synchronization areas in the rewritable area, each clock synchronization area having a data pattern that is permanent, each clock synchronization area defining a location of an associated rewritable area,
   whereby the clock track is used for controlling a frequency of the clock used of writing data on the rewritable layer and the synchronization areas are used for controlling the phase of the clock used for writing data on the rewritable layer.

8. The optical disk of claim 7 further comprising:
   the rewritable layer logically divided into a plurality of zones; and
   the rewritable areas within each zone having a bit density such that the clock used for writing data on the rewritable layer has a constant frequency within each zone.

* * * * *